(12) United States Patent
Jung

(10) Patent No.: US 6,529,509 B1
(45) Date of Patent: Mar. 4, 2003

(54) SWITCH CONTROLLING APPARATUS FOR SMALL CAPACITANCE ATM EXCHANGE

(75) Inventor: Sung Hyoun Jung, Kyoungki-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/185,985

(22) Filed: Nov. 4, 1998

(30) Foreign Application Priority Data

Nov. 13, 1997 (KR) .............................................. 97-59803

(51) Int. Cl.[7] .............................................. H04L 12/56
(52) U.S. Cl. .................................... 370/395.4; 370/461
(58) Field of Search ............................. 370/395.1, 398, 370/395.4, 395.41, 395.42, 395.43, 412, 413, 414, 415, 416, 417, 418, 422, 423, 428, 429, 445, 447, 461, 462

(56) References Cited

U.S. PATENT DOCUMENTS 5,663,959 A 9/1997 Nakagawa

*Primary Examiner*—Kwang Bin Yao
(74) *Attorney, Agent, or Firm*—J. Harold Nissen; Myron Greenspan; Lackenbach Siegel

(57) ABSTRACT

A switch controlling apparatus for small capacitance ATM exchange comprises Line Interface Modules having a plurality of buffers for storing cell data inputted from an outside apparatus, and a plurality of self order comparators for determining whether the cell data through a contorl bus from a switch module is mine and producing an enable signal when the cell data is determined to mine. It is possible to connect sequentially a plurality of LIMs to the switch module at integer times rate of input cell rate, to simplify the structure of the apparatus of the present invention and thereby to realize stable data communication.

18 Claims, 4 Drawing Sheets

SWITCH CONTROLLING APPARATUS FOR SMALL CAPACITANCE ATM EXCHANGE

FIELD OF THE INVENTION

This invention relates to an Asynchronous Transfer Mode (ATM) exchange, and, more particularly, to a switch controlling apparatus for small capacitance ATM exchange wherein, in the ATM exchange which receives fixed lengths of data being called cells from a plurality of Line Interface Modules(LIMs) and transfer the data proper output terminal, thereby exchanging a signal, when the ATM exchange receives the cell data from the LIMs, the ATM exchange makes a switch to process data without data collision, thereby simplifying the switch circuit and enhancing reliability thereof.

BACKGROUND OF THE INVENTION

In general, an ATM exchange has a switch connected to a plurality of LIMs. Conventionally, an arbitrator is used as means for causing the switch to receive cell data from the LIMs without collision therebetween.

There is shown in FIG. 1 a schematic structure for the ATM exchange which comprises a plurality of LIMs 1 connected to the outside of the ATM exchange, a switch module 2 transferring the cell data from the LIMs1 through output ports thereof(not shown) to other apparatus, and a control module connected to the switch module 2 and for performing various control functions. As shown in the drawing, the switch module 2 is connected to numerous LIMs 1 proportional to data processing capacitance thereof.

In the ATM exchange, however, various conditions such as existence and nonexistence of a cell, a priority of a cell, etc. must be considered for efficient management of inputted cells, thereby making constitution of the arbitrator complex and occurring a signal delay as the result of that.

SUMMARY OF THE INVENTION

Also, in the U.S. Pat. No. 5,663,959 there is disclosed an ATM cell switching apparatus which serve to prevent degradation of user cells in the ATM switch and preserve the quality of control cells, even upon increase in the number of control cells, in which comprises input cell management means for discriminating a type of cell coming through each input cell highway, distributing user cells and control cells to said ATM switch and control cell processing unit respectively; and output cell management means for discriminating an idle cell output from said ATM switch, inserting a control cell output from said control cell processing unit into a position of discriminated idle cell, and ouputting cells to each said output cell highway.

The patent shows that the control cell to be processed by the ATM switch is dropped in the control cell processing unit and an idle cell output instruction signal is provided from the control cell FIFO in order to preserve the quality of the output control cells and prevent degradation of user cells in the ATM switch, even upon increase in the number of control cells. However as the patent has complex constitution to process input cells, this apparatus is also noneffective as the above prior art.

Therefore, when rate of the cell data to be inputted to the switch module is low, the applicant pays attention to that it is efficient to connect sequentially the cell data to the switch module and process the same without using complex arbitrators.

In view of the foregoing, it is an object of this invention to provide a switch controlling apparatus for small capacitance ATM exchange which connects sequentially a plurality of LIMs to the switch module at integer times rate of input cells rate, processes data to be inputted to the apparatus without data collision as simple structure and thereby enhance the stability of the apparatus performance.

In accordance with one aspect of the invention, there is provided a small capacitance ATM exchange comprising a plurality of LIMs connected to the outside of the ATM exchange, a switch module transferring the cell data from the LIMs through output ports thereof to other apparatus, and a control module connected to the switch module and for performing various control functions characterized in that; the LIMs being for controlling switching of the ATM exchange and comprises a plurality of storage means for storing cell data inputted from an outside apparatus, and a plurality of self order comparators for determining whether the cell data through a control bus from the switch module is mine and producing an enable signal when the cell data is determined to mine.

In accordance with another aspect of the invention, there is provided a small capacitance ATM exchange comprising a plurality of LIMs connected to the outside of the ATM exchange, a switch module transferring the cell data from the LIMs through output ports thereof to other apparatus, and a control module connected to the switch module and for performing various control functions characterized in that; the LIMs being for controlling switching of the ATM exchange and comprises a plurality of storage means for storing cell data inputted from an outside apparatus and transmitting the cell data to a plurality of arbitrators and said each arbitrators being for receiving from a signal from said storage means and for providing each enable signal thereto for causing said storage means to send a data to the switch module.

BRIEF DESCRIPTION OF THE DRAWINGS

The invention disclosed herein will be understood better with reference to the following drawing of which.

DETAILED DESCRIPTION OF THE PREFERRED EMBODIMENTS

Hereinbelow, detailed embodiments of the present invention will be described in detail with reference to accompanying drawings.

Figure 1:
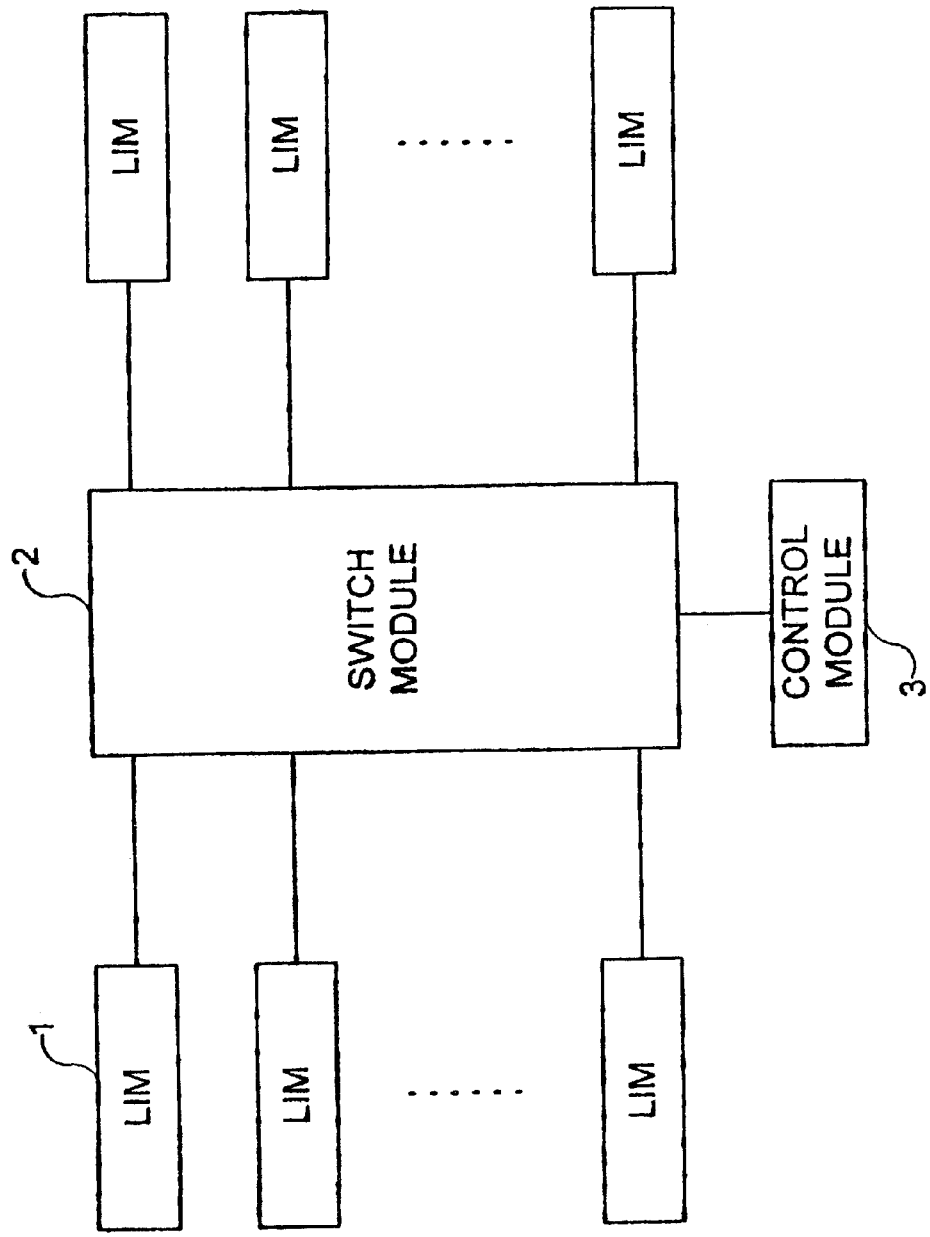
FIG. 1 is a block diagram for an architecture of a general ATM exchange.
Figure 2:
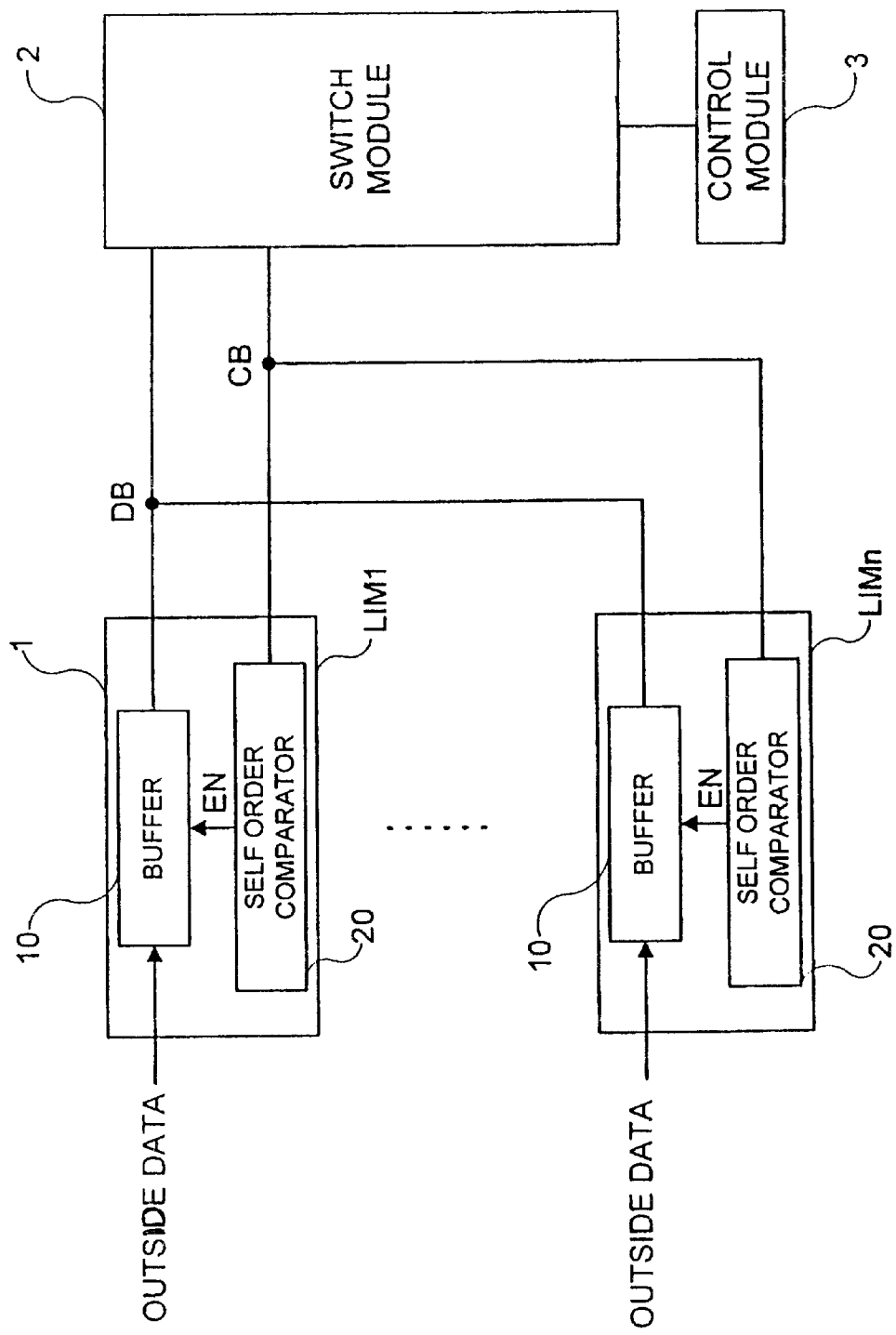
FIG. 2 is a block diagram for an architecture between a plurality of LIMs and a switch module according to one preferred embodiment of the present invention.

The switch controlling apparatus for the small capacitance ATM exchange according to the present embodiment is comprised of, as shown in FIG. 2, a plurality of LIMs, LIM1 to LIMn 1 connected to the outside of the ATM exchange, a switch module 2 transferring the cell data from the LIMs1 through output ports thereof(not shown) to other apparatus, and a control module 3 connected to the switch module 2 and for performing various control functions. The LIMs 1 comprises a plurality of buffers 10 for storing cell data inputted from an outside apparatus(not shown), and a plurality of self order comparators 20 for determining whether the cell data through a control bus from the switch module is mine and producing an enable signal(EN) when each cell data is determined to mine.

This invention usually uses a common data bus(DB) and a common control bus (CB)for the switch module 2 to communicate with the LIM1 to LIMn. In this case, using one data bus in common by a plurality of LIM1 to LIMn often cause data collision. The apparatus of the present invention stores the data from the outside apparatus into the buffers 10. The switch module 2 reads in the data in each buffer 10 and process the same in order of LIM1, LIM2, LIM3 . . . LIMn through the CB. In this case, each self order comparator 20 of the LIM1 determine whether the data inputted through the CB is mine by comparing the data with each self order inherent number inherently given and stored to each comparator 20, provide the EN with the buffer 10 and cause said associated buffer 10 to output the data if coincident as the result of that.

The number n of signal lines for the CB is determined dependent on the number of the LIMs to be connected to the switch module 2. For example, when 4 LIMs are connected to the switch module 2, 2 signal lines are needed from the equation of $2^n=4$ by a rising edge and a falling edge of a pulse wave, and when 16 LIMs are connected to the switch module 2, 4 signal lines are needed from the equation of $2^n=16$.

Figure 3:
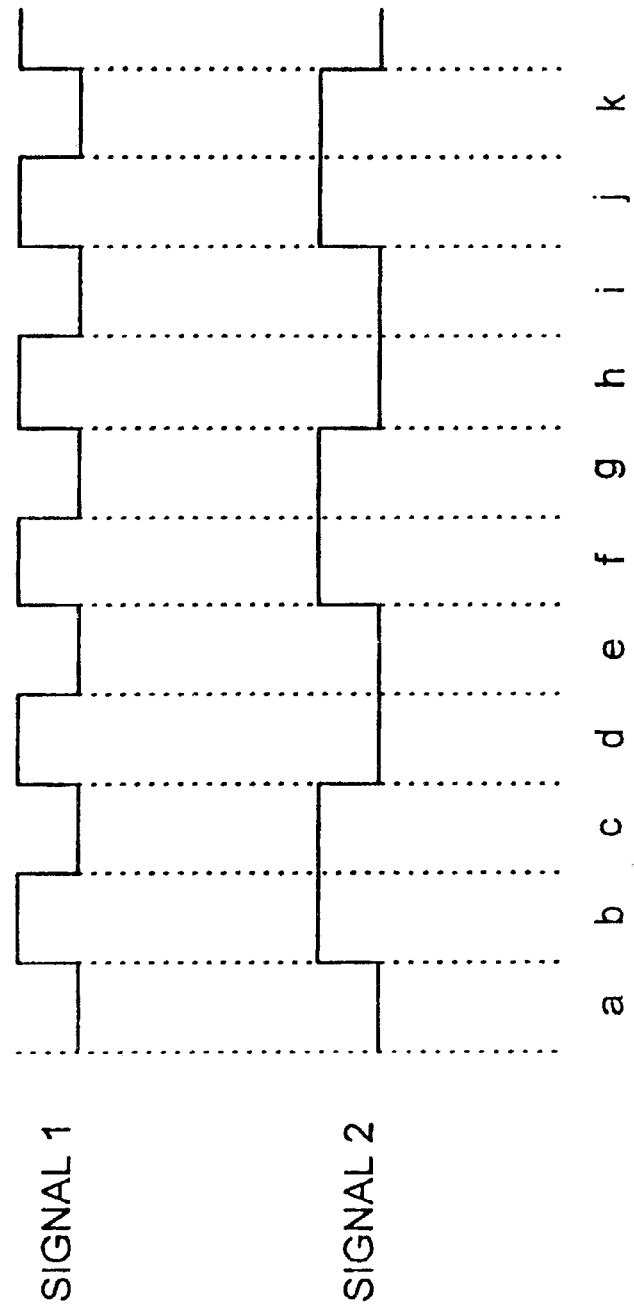
FIG. 3 is a timing chart of control signals for 4 LIMs.

There are illustrated in FIG. 3 signal waves of the CB for 4 LIMs. As forementioned, each self order inherent number stored to each comparator 20 is compared with each control signal of FIG. 3. For example, if the inherent numbers of LIM1, LIM2, LIM3 and LIM4 respectively correspond to 00, 11, 01 and 10, the LIM1,LIM2,LIM3 and LIM4 are chosen by a,b,c and d waves of FIG. 3 and the data in the buffers 10 of associated LIMs is processed in turn in the switch module 2.

Figure 4:
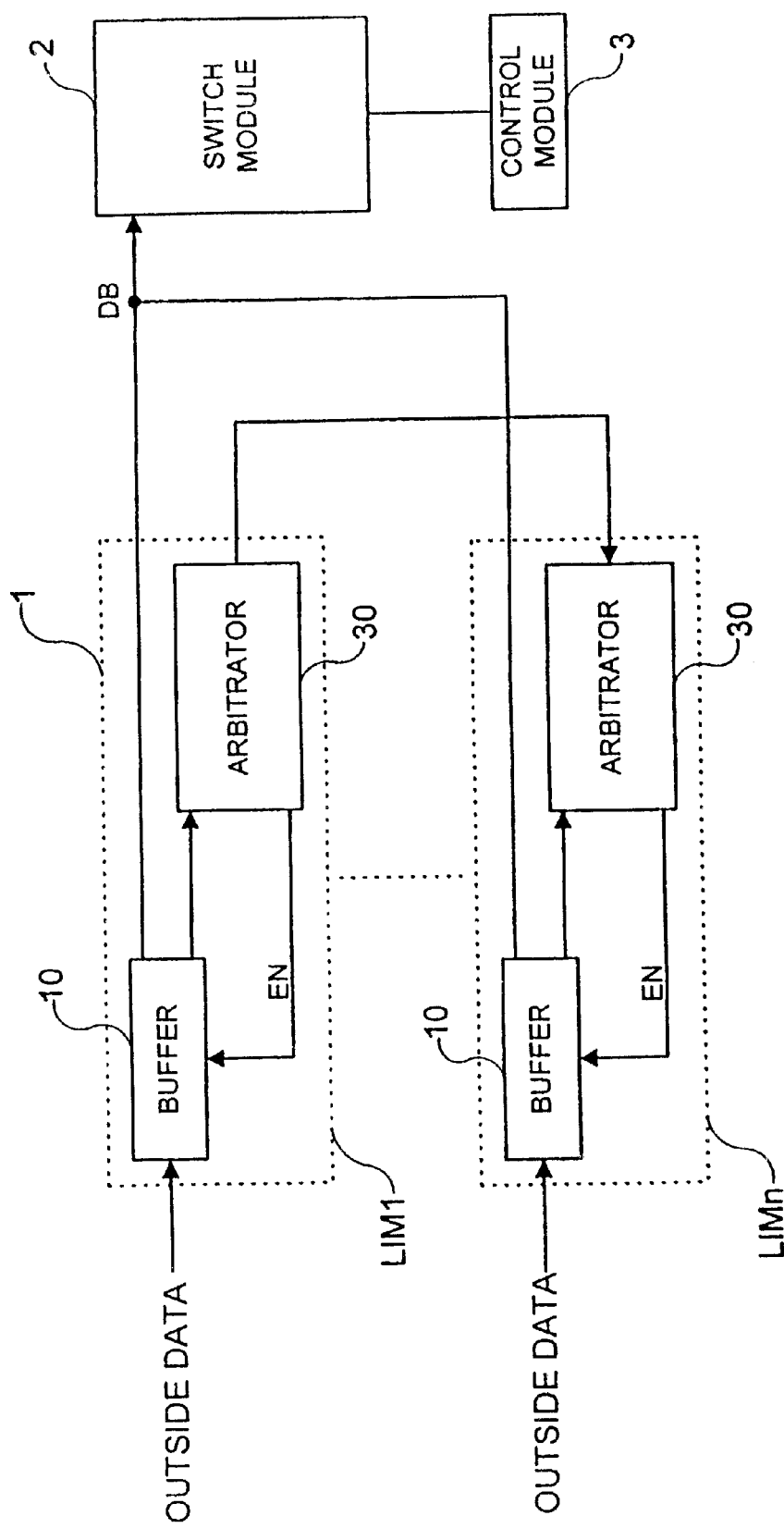
FIG. 4 is a block diagram for an architecture between the LIMs and a switch module according to the other preferred embodiment of the present invention.

FIG. 4 is the apparatus of another embodiment according to the present invention, in which the constitution of the LIMs 1 slightly differs from the LIMs 1 in FIG. 2 and arbitrators 30 are used instead of the self order comparators 20. When the data is inputted to one of the buffers 10 of LIM1, the associated buffer 10 transmits a signal informing data input to associated arbitrator 30 then the arbitrator 30 sends an enable signal (EN) to the buffer 10. Here one of the arbitrators 30 informs the remaining arbitrators 30 that it already has occupied the data bus to prevent concurrent occupying of the data bus. If one of the arbitrators 30 does not occupied the data bus, the arbitrator 30 having first priority order among remaining arbitrators 30 of the LIMs 1 occupies the data bus according to the priority order.

As explained hereinabove, according to the present invention, it is possible to connect sequentially a plurality of LIMs to the switch module at integer times rate of input cells rate, to simplify the structure of the apparatus of the present invention and thereby to realize stable data communication.

It is further understood by those skilled in the art that the foregoing description is a preferred embodiment of the disclosed apparatus and that various changes and modifications may be made in the invention without departing from the spirit and scope thereof.

What is claimed is:

1. A small capacitance ATM exchange comprising a plurality of LIMs connected to the outside of the ATM exchange, a switch module transferring the cell data from the LIMs through output ports thereof to other apparatus, and a control module connected to the switch module and for performing various control functions characterized in that; the LIMs being for controlling switching of the ATM exchange and comprises a plurality of storage means for storing cell data inputted from outside apparatus, and a plurality of self order comparing means for determining whether the cell data through a control bus from the switch module is mine and producing an enable signal when the cell data is determined to mine.

2. A small capacitance ATM exchange as claimed in claim 1, in which the storage means is a buffer.

3. A small capacitance ATM exchange as claimed in claim 1, in which said each self order comparing means compares a signal through the control bus from the switch module with a self order inherent number inherently given and stored to each comparing means and provide an enable signal associated buffer if coincident as the result of that.

4. A small capacitance ATM exchange as claimed in claim 3, in which the number n of signal lines of the control bus is determined by the equation of $2^n$=the number of LIMs.

5. A small capacitance ATM exchange comprising a plurality of LIMs connected to the outside of the ATM exchange, a switch module transferring the cell data from the LIMs through output ports thereof to other apparatus, and a control module connected to the switch module and for performing various control functions characterized in that; the LIMs being for controlling switching of the ATM exchange and comprises a plurality of storage means for storing cell data inputted from an outside apparatus and a plurality of self-order comparators for determining whether the cell data through a control bus from the switch module is mine and producing and enable signal when the cell data is determined to be mine, transmitting the cell data to a plurality of arbitrating means and said each arbitrating means being for receiving a signal from said storage means and for providing each enable signal thereto for causing said storage means to send a data to the switch module.

6. A small capacitance ATM exchange as claimed in claim 5, in which if one arbitrating means in said arbitrating means informs other arbitrating means that it already has occupied the data bus concurrent occupying of the data bus is prevented.

7. A small capacitance ATM exchange as claimed in claim 5, in which if one arbitrator in said arbitrating means has not occupied the data bus, other arbitrating means have first priority order among remaining arbitrating means of the LIMs to occupy the data bus according to the first priority order.

8. A small capacitance ATM exchange comprising a plurality of LIMs connected to the outside of the ATM exchange, a switch module transferring the cell data from the LIMs through output ports thereof to other apparatus, and a control module connected to the switch module and for performing various control functions, wherein the LIMs control switching of the ATM exchange and comprises a plurality of storage means for storing cell data inputted from outside apparatus, and switch controlling means for the small capacitance ATM exchange for connecting a plurality of LIMs to the switch module at integer times rate of input cells rate and processes data to be inputted to the other apparatus without data collision, and the switch controlling means includes a plurality of self order comparing means for determining whether the cell data through a control bus from the switch module is mine and producing an enable signal when the cell data is determined to mine.

9. The small capacitance ATM exchange as claimed in claim 8, wherein the switch controlling means includes means for transmitting the cell data to a plurality of arbitrating means and said each arbitrating means being for receiving a signal from said storage means and for providing each enable signal thereto for causing said storage means to send a data to the switch module.

10. A small capacitance ATM exchange as claimed in claim 8, in which the storage means is a buffer.

11. A switch controlling apparatus for a small capacitance ATM exchange, comprising:

a plurality of storage means for storing cell data inputted from an outside apparatus;

a plurality of self-order comparators for determining whether the cell data inputted through a common control bus from a switch module is mine and for producing an enable signal when the cell data is determined to mine;

a switch module for transferring the cell data from the LIMs through output ports therefrom to said outside apparatus;

said LIMs control switching of the ATM exchange and include the plurality of storage means for storing the cell data from the outside apparatus;

a control module connected to the switch module for performing various control functions; and switch controlling means for the small capacitance ATM exchange for connecting a plurality of the LIMs to the switch module at integer times rate of input cells rate and processes data to be inputted to the outside apparatus without data collision.

12. The switch controlling apparatus for a small capacitance ATM exchange as claimed in claim 11, wherein the LIMs control the transmission of cell data to a plurality of arbitrators and each said arbitrator is provided to receive a signal from said storage means and for providing each said enabling signal thereto to cause said storage means to send data to the switch means.

13. The switch controlling apparatus for a small capacitance ATM exchange as claimed in claim 11, wherein the storage means is a buffer.

14. The switch controlling apparatus for a small capacitance ATM exchange as claimed in 11, wherein the storage means is connected to the self-order comparator and is activated by an enable signal from it to output data to send the output data to the switch module.

15. The switch controlling apparatus for a small capacitance ATM exchange as claimed in claim 11, wherein the self-order comparator determines whether the data input through the common control bus is its own by comparing the data with each self-order inherent number.

16. The switching controlling apparatus for a small capacitance ATM exchange as claimed in claim 15, wherein the self-order comparator determines whether each cell data is its own before providing the enablement signal.

17. The switching controlling apparatus for a small capacitance ATM exchange as claimed in claim 11, wherein the LIMs are sequentially connected to the switch module at integer times rate of input cells rate whereby to provide stable data communication.

18. The switch controlling apparatus for a small capacitance ATM exchange as claimed in claim 11, wherein the storage means is a buffer.

* * * * *